United States Patent
Ryu et al.

(10) Patent No.: US 8,906,546 B2
(45) Date of Patent: Dec. 9, 2014

(54) NON-AQUEOUS ELECTROLYTE AND LITHIUM AIR BATTERY INCLUDING THE SAME

(75) Inventors: Young-gyoon Ryu, Suwon-si (KR); Dong-min Im, Seoul (KR); Myung-jin Lee, Seoul (KR); Dong-joon Lee, Seoul (KR); Sang-bok Ma, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 294 days.

(21) Appl. No.: 13/178,116

(22) Filed: Jul. 7, 2011

(65) Prior Publication Data

US 2012/0107728 A1 May 3, 2012

(30) Foreign Application Priority Data

Oct. 29, 2010 (KR) ........................ 10-2010-0107015

(51) Int. Cl.
*H01M 12/08* (2006.01)
*H01M 10/0567* (2010.01)
*H01M 4/38* (2006.01)
*H01M 12/06* (2006.01)
*H01M 4/40* (2006.01)

(52) U.S. Cl.
CPC .............. *H01M 12/06* (2013.01); *Y02E 60/128* (2013.01); *H01M 4/382* (2013.01); *H01M 2300/0025* (2013.01); *H01M 4/405* (2013.01); *H01M 10/0567* (2013.01)
USPC ............................ 429/188; 429/324; 429/403

(58) Field of Classification Search
USPC ................................................ 429/402–407
See application file for complete search history.

(56) References Cited

U.S. PATENT DOCUMENTS

| | | | |
|---|---|---|---|
| 2004/0241537 A1* | 12/2004 | Okuyama et al. | 429/86 |
| 2008/0176124 A1* | 7/2008 | Imagawa et al. | 429/27 |
| 2009/0253048 A1* | 10/2009 | Shima | 429/338 |
| 2010/0304222 A1 | 12/2010 | Park et al. | |

FOREIGN PATENT DOCUMENTS

| | | | |
|---|---|---|---|
| CN | 101740814 | | 6/2010 |
| JP | 2000243443 A | * | 9/2000 |
| JP | 2003077536 A | * | 3/2003 |
| KR | 10-2008-0009313 | | 1/2008 |
| WO | WO 2006/129992 | | 12/2006 |
| WO | WO 2010/080009 | | 7/2010 |

OTHER PUBLICATIONS

IDPL Machine Translation of JP 2000243443 A.*
IDPL Machine Translation of JP 2003077536 A.*
English translation of JP 2003-077536 A.*
Office Action (non-final rejection), Korean Intellectual Property Office, Sep. 8, 2011.

* cited by examiner

*Primary Examiner* — Barbara Gilliam
*Assistant Examiner* — Robert S Carrico
(74) *Attorney, Agent, or Firm* — Cantor Colburn LLP

(57) ABSTRACT

A non-aqueous electrolyte and a lithium air battery including the same. The non-aqueous electrolyte may include an oxygen anion capturing compound to effectively dissociate the reduction reaction product of oxygen formed during discharging of the lithium air battery, reduce the overvoltage of the oxygen evolution reaction occurring during battery charging, and enhance the energy efficiency and capacity of the battery.

20 Claims, 6 Drawing Sheets

NON-AQUEOUS ELECTROLYTE AND LITHIUM AIR BATTERY INCLUDING THE SAME

CROSS-REFERENCE TO RELATED APPLICATION

This application claims the benefit of Korean Patent Application No. 10-2010-0107015, filed on Oct. 29, 2010 in the Korean Intellectual Property Office, the disclosure of which is incorporated herein in its entirety by reference.

BACKGROUND

1. Field

Aspects of the present disclosure relate to non-aqueous electrolytes and lithium air batteries including the same.

2. Description of the Related Art

Recently, research on developing battery systems capable of providing the high energy densities required by electric vehicles has been actively conducted in academia and industry, and interest in lithium air batteries that are theoretically capable of providing the highest energy densities among conventional systems has been growing.

A lithium air battery has a theoretical energy density of about 3000 Wh/kg or more, which corresponds to about 10 times that of a lithium ion battery. Furthermore, a lithium air battery is environmentally friendly and may be safer to use than a lithium ion battery. Accordingly, many advances are being made in the development of lithium air batteries.

A lithium air battery includes a positive electrode (oxygen electrode), a negative electrode (lithium metal), and an electrolyte. When a lithium air battery operates, release (during battery charging) and absorption (during battery discharging) of lithium occur at the negative electrode while reduction (during battery discharging) and release (during battery charging) of oxygen occur at the positive electrode.

In a lithium air battery, capacity and lifespan of a battery system is determined by reduction and release of oxygen at the positive electrode. Lithium oxides ($Li_2O$, $Li_2O_2$) produced by reduction of oxygen during battery discharging do not easily dissolve in organic solvents and thus block pores in an electrode, thereby increasing the charging voltage and deteriorating the lifespan and capacity of the battery.

SUMMARY

Non-aqueous electrolytes for dissociating products produced by reduction of oxygen during battery discharge are provided to reduce the charge potential and improve charge and discharge capacity.

Lithium air batteries including the non-aqueous electrolytes are also provided.

Additional aspects and/or advantages of the invention will be set forth in part in the description which follows and, in part, will be obvious from the description, or may be learned by practice of the invention.

An aspect of the present invention provides a non-aqueous electrolyte including an oxygen anion capturing compound.

According to an exemplary embodiment, the oxygen anion may be derived from $Li_2O$ or $Li_2O_2$, which are lithium oxides.

According to another exemplary embodiment, the oxygen anion capturing compound may include an oxazolidinone derivative in which an electron-withdrawing group is bound to an N-position thereof.

According to another exemplary embodiment, the oxygen anion capturing compound may include an oxazolidinone derivative represented by the following Formula 1:

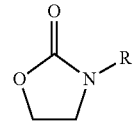

[Formula 1]

where, R is selected from the group consisting of $-CF_3$, $-CN$, $-SO_3H$, $-SO_2R^1$, $-NO_2$, $-N^+R^2{}_4$, $-CO-R^3$, $-CO-OR^4$, $-CO-NR^5{}_2$, $-F$, $-Cl$, $-Br$, and a hydrocarbon having 1 to 10 carbons, and $R^1$, $R^2$, $R^3$, $R^4$, and $R^5$ are each independently hydrogen or an alkyl group of 1 to 5 carbons that are unsubstituted or substituted by $-F$, $-Cl$, $-Br$, $-CN$, or $-NO_2$.

According to another exemplary embodiment, the oxygen anion capturing compound concentration may range from about 0.1% to about 50% by weight based on the total amount of the non-aqueous electrolyte.

Another aspect of the present invention provides a lithium air battery including a negative electrode for absorbing and releasing lithium ions; a positive electrode disposed to face the negative electrode and using oxygen as a positive electrode active material; and the non-aqueous electrolyte disposed between the negative electrode and the positive electrode.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
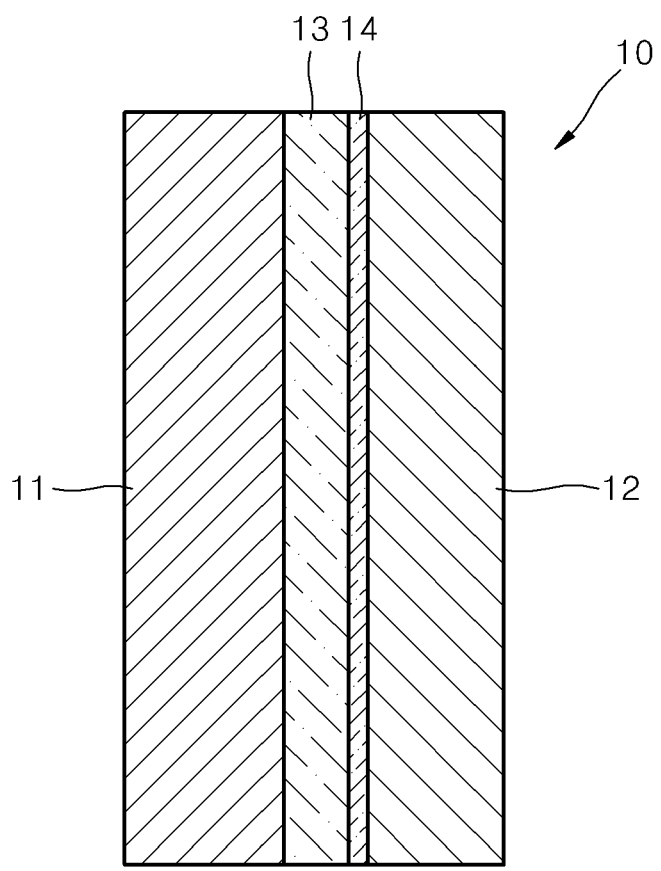
FIG. 1 is a partial cross-sectional view schematically illustrating a lithium air battery according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A non-aqueous electrolyte according to an aspect of the present invention may include an oxygen anion capturing compound.

A lithium air battery may use an aqueous electrolyte or a non-aqueous electrolyte as an electrolyte. When a non-aqueous electrolyte is used, an oxidation/reduction reaction of oxygen occurs in the positive electrode as follows.

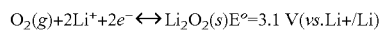

$O_2(g)+2Li^++2e^- \leftrightarrow Li_2O_2(s) E°=3.1 V(vs.Li+/Li)$

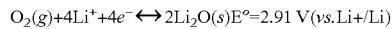

$O_2(g)+4Li^++4e^- \leftrightarrow 2Li_2O(s) E°=2.91 V(vs.Li+/Li)$

That is, when oxygen in the positive electrode meets with lithium ions from the negative electrode and is reduced during battery discharging, $Li_2O$ and/or $Li_2O_2$ may be formed as lithium oxides.

However, lithium oxides thus formed do not readily dissolve in a non-aqueous electrolyte and exist in solid phases. These solid-phase oxides have small contact areas with battery interfaces. In addition, electrochemical reaction rates with respect to cases in which these oxides do not dissociate into lithium cations and oxygen anions in an electrolyte are slower than those with respect to cases in which the oxides do dissociate into lithium cations and oxygen anions in an electrolyte because a large overvoltage with respect to a reverse reaction occurs in the cases in which the oxides do not dissociate into lithium cations and oxygen anions in an electrolyte.

In addition, when a lithium oxide is present in a relatively excessive amount in a lithium air battery having an air electrode, pores in the air electrode are blocked during battery discharging and thus charge and discharge energy efficiencies and lifespan characteristics are deteriorated. If the air electrode is completely blocked, oxygen in the atmosphere is no longer reduced.

However, when an oxygen anion capturing compound having a chemical structure with an affinity for oxygen anions present in diverse forms in a lithium oxide is added to a non-aqueous electrolyte, the solubility of the lithium oxide may be increased, and oxygen anions are oxidized to induce a reaction to release the anions into oxygen more readily and thus an overvoltage occurring during battery discharging may be decreased.

According to an exemplary embodiment, the oxygen anion capturing compound may be an oxazolidinone derivative in which an electron-withdrawing group is bound to an N-position thereof. For example, the oxazolidinone derivative may be represented by the following Formula 1:

[Formula 1]

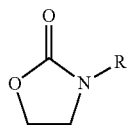

where R is selected from the group consisting of —$CF_3$, —CN, —$SO_3H$, —$SO_2R^1$, —$NO_2$, —$N^+R^2_4$, —CO—$R^3$, —CO—$OR^4$, —CO—$NR^5_2$, —F, —Cl, —Br, and a hydrocarbon having 1 to 10 carbons, and $R^1$, $R^2$, $R^3$, $R^4$, and $R^5$ are each independently hydrogen or an alkyl group of 1 to 5 carbons, unsubstituted or substituted by —F, —Cl, —Br, —CN, or —$NO_2$.

The hydrocarbon having 1 to 10 carbons may be a compound whose hydrogen is unsubstituted or partially or totally substituted by —F, —Cl, —Br, —Cn, or —$NO_2$.

Dissociation of a lithium oxide having 3-acetyl-2-oxazolidinone as an example of a derivative having an oxazolidinone backbone, will be described as follows:

[Formula 6]

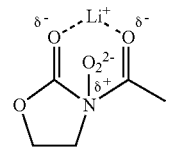

As shown in Formula 6, since both a carbonyl group of the oxazolidinone backbone and a carbonyl group bound to the N withdraw electrons from the N, the N therebetween is in a state where electrons are relatively deficient. Accordingly, since the N has a tendency to be relatively positive, a coordination bond may be effectively formed with an oxygen anion generated during battery discharging. It may be understood that the N generally serves as an anion receptor. When a lithium oxide is finally formed during battery discharging, and if compounds with affinity for an oxygen anion are present around the oxide, the compounds may hinder an oxygen anion from stably combining with a lithium ion, and in addition, the oxide may be present in a relatively oxidizable form.

In addition, such an oxazolidinone derivative has an electrochemically stable structure and may be structurally similar to a non-aqueous solvent used in a non-aqueous electrolyte to be readily dissolved in the solvent and thus requirements for an electrolyte of a lithium air battery may be satisfied.

According to another exemplary embodiment, at least one of the oxazolidinone derivatives represented by the following Formulas 2 to 5 may be used as the oxygen anion capturing compound to allow coordination to be performed by lithium cations as well as oxygen anions and synthesis thereof to be easily carried out.

[Formula 2]

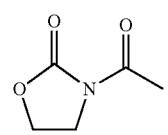

[Formula 3]

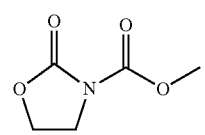

[Formula 4]

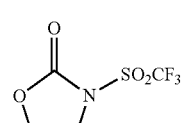

[Formula 5]

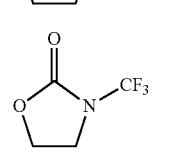

Although the degree to which a coordination bond with lithium cations is formed may differ according to the structure of the electron-withdrawing group bound to the N, the oxazolidinone derivatives represented by Formulas 2 to 5 may be used because they have structures that are particularly effective in forming a coordination bond with lithium cations.

The oxygen anion capturing compound may be included in an amount of about 0.1% to about 50% by weight, for example, about 0.5% to about 20% by weight, or for example, about 1% to about 5% by weight, based on the total weight of the non-aqueous electrolyte. Within the content range, the oxygen anion capturing compound may be readily dissolved in a non-aqueous solvent and may effectively improve charge and discharge efficiencies.

Hereinafter, a lithium air battery including the non-aqueous electrolyte will be described in detail with reference to the accompanying drawings.

FIG. 1 is a partial cross-sectional view of a lithium air battery according to another exemplary embodiment.

A lithium air battery 10 according to an aspect of the present invention includes a negative electrode 11 that absorbs and releases lithium ions; a positive electrode 12 that is disposed to face the negative electrode 11 and that uses oxygen as a positive electrode active material; and the above-described electrolyte as a non-aqueous electrolyte 13 disposed between the negative electrode 11 and the positive electrode 12.

The negative electrode 11 absorbs and releases lithium ions. The negative electrode 11 may include at least one material selected from the group consisting of lithium metal, a lithium metal-based alloy, and a lithium intercalation compound. For example, the lithium metal-based alloy may include an alloy of aluminum, tin, magnesium, indium, calcium, titanium, vanadium, or a combination thereof with lithium.

As for the positive electrode 12, any material may be used without limitation as long as it has porosity and conductivity. For example, porous carbon-based materials may be used. Examples of a carbon-based material are carbon blacks, graphites, graphene, activated carbons, carbon fibers, and combinations thereof. An oxygen reduction catalyst may be added to the positive electrode 12. Examples of the catalyst are a noble metal-based catalyst, such as platinum, gold, silver, palladium, ruthenium, rhodium, and osmium; an oxide-based catalyst, such as manganese oxide, iron oxide, cobalt oxide, and nickel oxide; an organic metal-based catalyst, such as cobalt phthalocyanine; and combinations thereof. The examples of the manganese oxide include manganese(II) oxide (MnO), manganese(II,III) oxide ($Mn_3O_4$), manganese(III) oxide ($Mn_2O_3$), manganese dioxide (manganese(IV) oxide) ($MnO_2$), and manganese(VII) oxide ($Mn_2O_7$). The examples of the iron oxide include iron(II) oxide (FeO), iron(II,III) oxide ($Fe_3O_4$), and iron(III) oxide ($Fe_2O_3$). The examples of the cobalt oxide include cobalt(II) oxide (cobaltous oxide) (CoO), cobalt(III) oxide (cobaltic oxide) ($Co_2O_3$), and cobalt(II,III) oxide ($Co_3O_4$). The examples of the nickel oxide include nickel(II) oxide (NiO), and nickel(III) oxide ($Ni_2O_3$).

As described above, the non-aqueous electrolyte 13 includes an oxygen anion capturing compound. The oxygen anion capturing compound may increase the solubility of lithium oxide produced from the reduction reaction of oxygen and thus a reaction in which oxygen anions are oxidized into and released as oxygen when the battery 10 is charged may be more readily induced to decrease the overvoltage occurring when the battery 10 is charged. Accordingly, charge and discharge efficiencies and lifespan of the lithium air battery 10 may be improved.

The oxygen anion capturing compound may include an oxazolidinone derivative in which an electron-withdrawing group is bound to the N-position thereof, and for example, the oxazolidinone derivative may be represented by Formula 1. Oxygen anion capturing compounds are described as above.

A non-aqueous organic solvent, which does not contain water, may be used in the non-aqueous electrolyte 13. A carbonate-based solvent, an ester-based solvent, an ether-based solvent, a ketone-based solvent, an organosulfur-based solvent, an organophosphorus-based solvent, a nonprotonic solvent, or any combination thereof may be used as the non-aqueous organic solvent.

Examples of the non-aqeuous organic solvent are ethylene carbonate (EC), propylene carbonate (PC), butylene carbonate (BC), dimethyl carbonate (DMC), diethyl carbonate (DEC), dipropyl carbonate (DPC), dibutyl carbonate (DBC), ethyl methyl carbonate (EMC), methyl propyl carbonate (MPC), ethyl propyl carbonate (EPC), fluoroethylene carbonate (FEC), dibutyl ether, tetraglyme, diglyme, dimthoxyethane, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and the like.

The non-aqueous organic solvent may be used alone or in combination with one or more other solvents. If the non-aqueous organic solvent is used in combination with one or more other solvents, the mixture ratio thereof may be appropriately controlled according to the desired battery performance, and this may be widely understood to those skilled in the art.

The non-aqueous organic solvent may include a lithium salt. The lithium salt may be dissolved in the organic solvent to act as a lithium supplier in the battery 10 and promote movement of lithium ions, for example, between the negative electrode 11 and a lithium ion conductive solid electrolyte membrane. The lithium salt may include one or more salts selected from the group consisting of $LiPF_6$, $LiBF_4$, $LiSbF_6$, $LiAsF_6$, $LiN(SO_2C_2F_6)_2$, $Li(CF_3\ SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiI, and $LiB(C_2O_4)_2$ (lithium bis(oxalato) borate; LiBOB). The concentration of the lithium salt may be in the range of about 0.1 to about 2.0 M. If the concentration of the lithium salt is within this range, the electrolyte 13 has appropriate levels of conductivity and viscosity, and thus the electrolyte 13 may have excellent electrolytic performance and lithium ions may be effectively moved.

The non-aqueous organic solvent may further include other metal salts in addition to the lithium salt. Examples of the metal salts are $AlCl_3$, $MgCl_2$, NaCl, KCl, NaBr, KBr, $CaCl_2$, and the like.

A separator 14 may be further disposed between the positive electrode 12 and the non-aqueous electrolyte 13. Any material may be used without limitation for the separator 14 as long as it has a composition capable of functioning within the conditions in which the lithium air battery 10 may be used. For example, the separator 14 may include a polymer nonwoven fabric such as a nonwoven fabric of polypropylene or a nonwoven fabric of polyphenylene sulfide, a porous film made of an olefin resin such as polyethylene or polypropylene, and two or more thereof in combination.

Although it was described that the above non-aqueous electrolyte 13 is interposed between the negative electrode 11 and the positive electrode 12, the non-aqueous electrolyte 13 may instead be partially or fully impregnated in the positive electrode 12. When the separator 14 is also provided, the electrolyte 13 may instead be impregnated in the separator 14.

The lithium air battery 10 may be a lithium primary battery or a lithium secondary battery. In addition, the lithium air battery 10 is not particularly limited in shape, and the shape of the lithium air battery 10 may be, for example, coin-type, button-type, sheet-type, laminated-type, cylindrical-type, flat-type, or horn-type. In addition, the lithium air battery 10 may be used in a large battery for electric vehicles.

The lithium air battery 10 having the configuration described above includes the non-aqueous electrolyte 13 containing an oxygen anion capturing compound that may dissociate lithium oxide to decrease the overvoltage of the oxygen generation reaction generated during battery charging to improve energy efficiency and capacity of the battery 10.

Hereinafter, the general inventive concept will be illustrated with reference to examples. However, the general inventive concept should not be limited to these Examples.

EVALUATION EXAMPLE 1

Impedance Measurement of a Non-aqueous Electrolyte in Accordance with Dissociation of Lithium Oxide First, in order to measure dissociation capability of an oxygen anion capturing compound used in a non-aqueous electrolyte according to an exemplary embodiment for lithium oxide, impedances of an electrolyte to which the oxygen anion capturing compound is added and an electrolyte to which the oxygen anion capturing compound is not added were measured and compared with each other.

Figure 2:
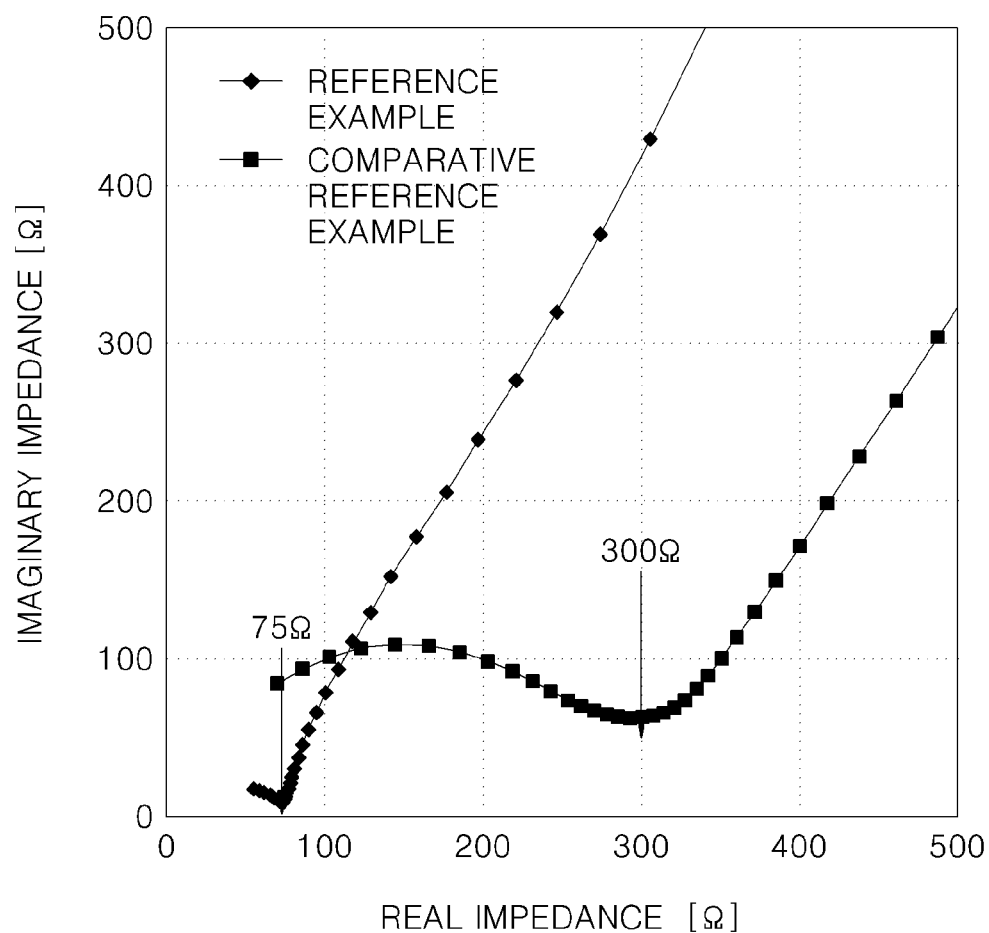
FIG. 2 is a graph illustrating results of impedance measurement of electrolytes in a Reference Example and a Comparative Reference Example.

A mixture including about 0.1 M of $Li_2O_2$ in propylene carbonate was used as a Comparative Reference Example for measurement of resistance of an electrolyte, and a mixture including about 0.1 M of 3-acetyl-2-oxazolidinone in the electrolyte in the Comparative Reference Example was used as a Reference Example. Resistances of the electrolytes were measured by using impedance spectroscopy, and a frequency response analyzer (1260) and an electrochemical interface (1287) from Solartron Analytical were used as a spectrometer system. Measurement was performed in the frequency range of about 1 Hz to about 1 MHz. The resistances of the electrolytes in the Reference Example and the Comparative Reference Example were measured, and the results are shown in FIG. 2. An impedance spectrum consists of a semicircle-type arc in the high frequency zone and an arc in the low frequency zone. The size of the semicircle-type arc in the high frequency zone represents the resistance of the corresponding electrolyte while the size of the arc in the low frequency zone represents a resistance corresponding to a charge transfer reaction.

As shown in FIG. 2, in the Reference Example in which about 0.1 M of 3-acetyl-2-oxazolidinone was applied, it can be seen that the resistance was very low, compared to the Comparative Reference Example in which 0.1 M of 3-acetyl-2-oxazolidinone was not added to the electrolyte. This means that $Li_2O_2$ was dissociated by 3-acetyl-2-oxazolidinone to reduce the resistance of the electrolyte.

Furthermore, area specific resistances were obtained from impedance data in FIG. 2, and ion conductivities of the electrolytes were calculated from the area specific resistances. The results are shown in the following Table 1.

TABLE 1

| | Area specific resistance ($\Omega \cdot cm^2$) | Ion conductivity (mS/cm) |
|---|---|---|
| Reference Example | 150 | 0.016 |
| Comparative Reference Example | 600 | 0.004 |

Referring to Table 1, it was found that the electrolyte in the Reference Example had an area specific resistance about one fourth of that of the electrolyte in the Comparative Reference Example and an ion conductivity about 4 times higher than that of the electrolyte in the Comparative Reference Example, respectively.

EXAMPLE 1

Manufacture of a Lithium Air Battery

About 1 wt % of 3-acetyl-2-oxazolidinone (Sigma Aldrich, CAS No. 1432-43-5) was added to propylene carbonate in which about 1 M of $LiClO_4$ had been dissolved to prepare a non-aqueous electrolyte.

A positive electrode active material (SGL Inc., Model Name 35BA) coated with a porous carbon black electrode on a carbon paper that had been subjected to a water repellent treatment was used, and lithium metal foil was used as a negative electrode. A separator (3501) from Celgard Inc., was used and the prepared non-aqueous electrolyte was applied to prepare a lithium air battery.

EXAMPLE 2

Manufacture of a Lithium Air Battery

A lithium air battery was manufactured in the same manner as in Example 1, except that about 5 wt % of 3-acetyl-2-oxazolidinone as in Example 1 was added.

COMPARATIVE EXAMPLE 1

A lithium air battery was manufactured in the same manner as in Example 1, except that propylene carbonate in which $LiClO_4$ was dissolved in a concentration of about 1 M was added instead of 3-acetyl-2-oxazolidinone as a non-aqueous electrolyte.

EVALUATION EXAMPLE 2

Charge-Discharge Experiment (1)

The lithium air batteries in Example 1 and Comparative Example 1 were charged at room temperature until voltages reached about 4.5 V at a current density of about 0.2 mA/cm$^2$, and discharged until the voltages reached about 2 V at the same current density. Subsequently, charge and discharge were repeatedly performed at the same current and voltage levels.

Figure 3:
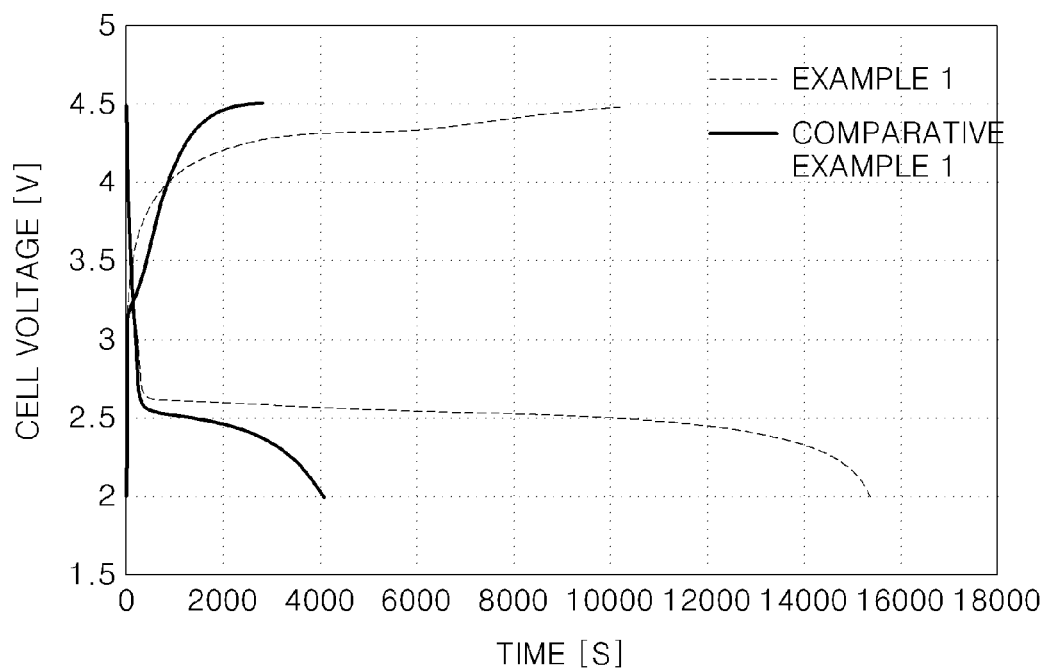
FIG. 3 is a graph illustrating results of charge and discharge of lithium air batteries in Example 1 and Comparative Example 1, measured according to Experimental Example 2.

Charge and discharge results obtained by measuring the electrical potential difference over time with respect to the first cycle are shown in FIG. 3. As shown in FIG. 3, it can be seen that the lithium air battery in Example 1 was lower in charge potential than the one in Comparative Example 1. This indicates that lithium oxides produced during battery discharging were well dissociated and thus overvoltage during battery charging was reduced.

Figure 4:
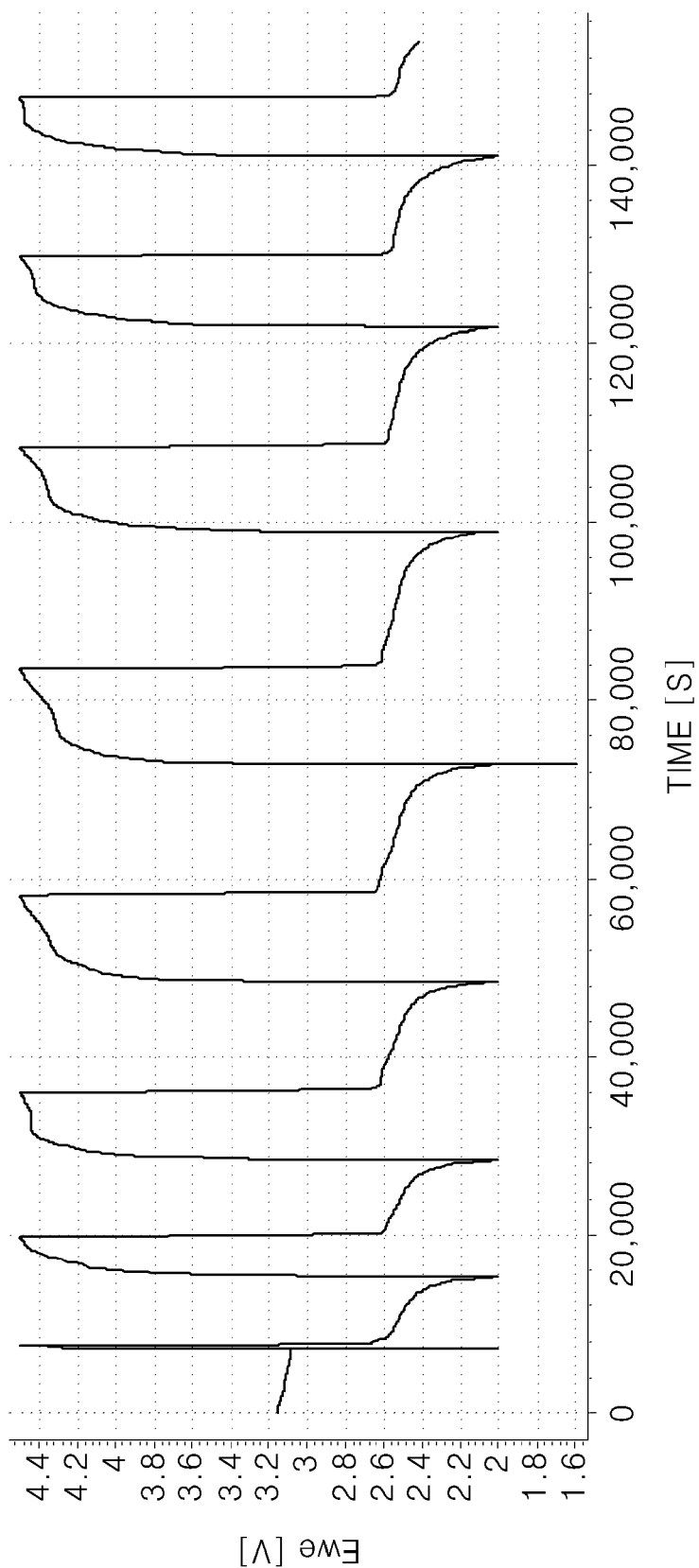
FIG. 4 is a graph illustrating analysis results of charge and discharge cycle characteristics over time of a lithium air battery manufactured according to Example 1.
Figure 5:
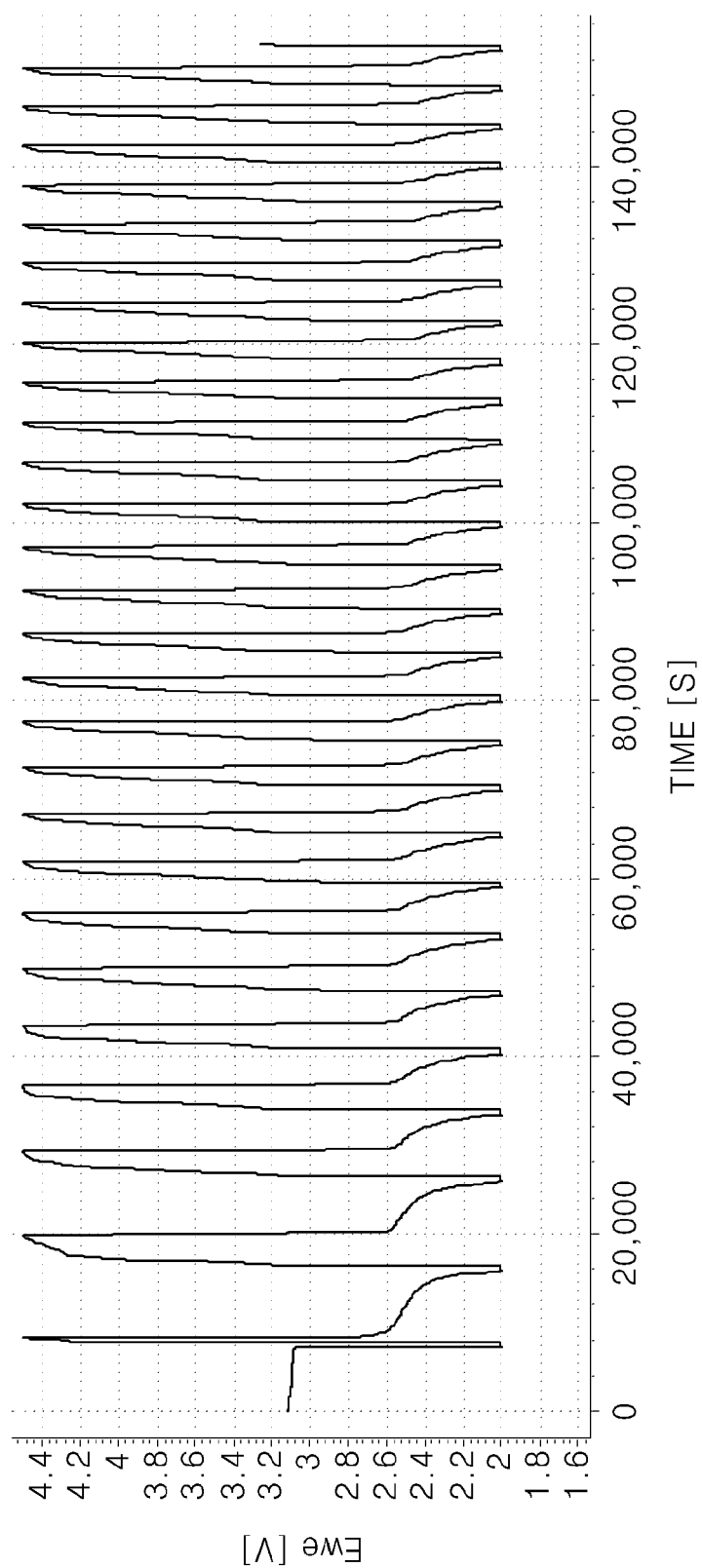
FIG. 5 is a graph illustrating analysis results of charge and discharge cycle characteristics over time of a lithium air battery manufactured according to Comparative Example 1.

In addition, for the lithium air batteries in Example 1 and Comparative Example 1, results in which charge and discharge cycle characteristics over time were analyzed are shown in FIGS. 4 and 5, respectively. As shown in FIGS. 4 and 5, it may be seen that the lithium air battery in Example 1 had a larger charge and discharge capacity and more enhanced lifespan characteristics than the one in Comparative Example 1.

EVALUATION EXAMPLE 3

Charge and Discharge Experiment (2)

The lithium air batteries in Example 2 and Comparative Example 1 were charged at room temperature until voltages reached about 4.6 V at a current density of about 0.2 mA/cm$^2$, and discharged until the voltages reached about 2 V at the same current density. Subsequently, charge and discharge were repeatedly performed at the same current and voltage levels.

Figure 6:
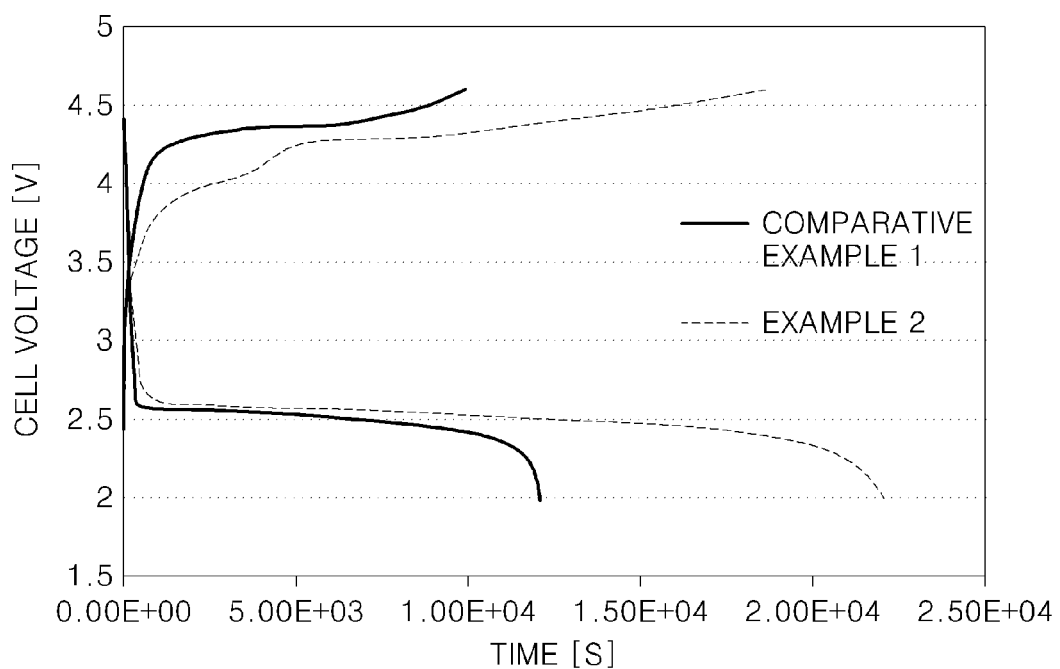
FIG. 6 is a graph illustrating experimental results of lithium air batteries in Example 2 and Comparative Example 1, measured according to Evaluation Example 3.

Charge and discharge results obtained by measuring the electrical potential difference over time with respect to the first cycle are shown in FIG. 6. As shown in FIG. 6, it may be seen that the lithium air battery in Example 2 was lower in charge potential than the one in Comparative Example 1. This indicates that lithium oxides produced during battery discharging were well dissociated and thus overvoltage during battery charging was reduced.

In Comparative Example 1 in which 3-acetyl-2-oxazolidinone was not added, experiments were performed by using a charge voltage higher than the one in Evaluation Example 2 to generate the oxidization of $Li_2O_2$ to some degree so that charge and discharge may occur. However, in Example 1 in which 3-acetyl-2-oxazolidinone was used as an additive, $Li_2O_2$ was well oxidized even at a low charge potential. Accordingly, Evaluation Examples 2 and 3 show that charge and discharge energy efficiencies of a battery may be effectively increased by the electrolyte of the present invention.

The non-aqueous electrolyte may include an oxygen anion capturing compound to effectively dissociate the reduction reaction product of oxygen formed during discharging of the lithium air battery, reduce overvoltage of the oxygen evolution reaction occurring during battery charging, and enhance the energy efficiency and capacity of the battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-aqueous electrolyte comprising an oxygen anion capturing compound, wherein the oxygen anion capturing compound is an oxazolidinone derivative in which an electron-withdrawing group is bound to the N-position thereof; and wherein the oxazolidinone derivative is represented by Formula 1:

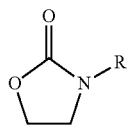

[Formula 1]

where R is selected from the group consisting of —CN, —SO$_3$H, —SO$_2$R$^1$, —NO$_2$, —N$^+$R$^2_4$, —CO—R$^3$, —CO—OR$^4$, —CO—NR$^5_2$, —F, —CL, —Br, and a hydrocarbon having 1 to 10 carbons, and R$^1$, R$^2$, R$^3$, R$^4$, and R$^5$ are each independently hydrogen or an alkyl group of 1 to 5 carbons, unsubstituted or substituted by —F, —Cl, —Br, —CN, or —NO$_2$, wherein the hydrocarbon having 1 to 10 carbons is a compound whose hydrogen is partially or totally substituted by —NO$_2$ or is a compound having 1 or 3 to 10 carbons and whose hydrogen is partially or totally substituted by —CN.

2. The non-aqueous electrolyte of claim 1, wherein the oxygen anion is derived from lithium oxide.

3. The non-aqueous electrolyte of claim 1, wherein the oxygen anion capturing compound is at least one oxazolidinone derivative represented by Formulas 2 to 4:

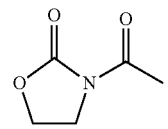

[Formula 2]

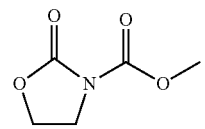

[Formula 3]

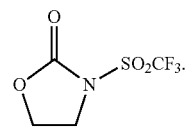

[Formula 4]

4. The non-aqueous electrolyte of claim 1, wherein the oxygen anion capturing compound concentration ranges from about 0.1% to about 50% by weight based on the total weight of the non-aqueous electrolyte.

5. The non-aqueous electrolyte of claim 4, wherein the oxygen anion capturing compound concentration ranges from about 1% to about 5% by weight based on the total weight of the non-aqueous electrolyte.

6. A lithium air battery comprising:
a negative electrode for absorbing and releasing lithium ions;
a positive electrode disposed to face the negative electrode and using oxygen as a positive electrode active material; and
a non-aqueous electrolyte comprising an oxygen anion capturing compound, and disposed between the negative electrode and the positive electrode, wherein the oxygen anion capturing compound is an oxazolidinone derivative in which an electron-withdrawing group is bound to the N-position thereof; and wherein the oxazolidinone derivative is represented by Formula 1:

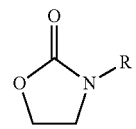

[Formula 1]

where R is selected from the group consisting of —CN, —SO$_3$H, —SO$_2$R$^1$, —NO$_2$, —N$^+$R$^2_4$, —CO—R$^3$, —CO—OR$^4$, —CO—NR$^5_2$, —F, —Cl, —Br, and a hydrocarbon having 1 to 10 carbons, and $R^1$, $R^2$, $R^3$, $R^4$, and $R^5$ are each independently hydrogen or an alkyl group of 1 to 5 carbons, unsubstituted or substituted by —F, —Cl, —Br, —CN, or —NO$_2$, wherein the hydrocarbon having 1 to 10 carbons is a compound whose hydrogen is partially or totally substituted by —NO$_2$ or is a compound having 1 or 3 to 10 carbons and whose hydrogen is partially or totally substituted by —CN.

7. The lithium air battery of claim 6, wherein the oxygen anion capturing compound is at least one oxazolidinone derivative represented by Formulas 2 to 4:

[Formula 2]

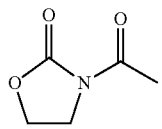

[Formula 3]

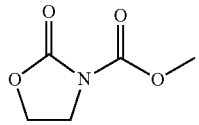

[Formula 4]

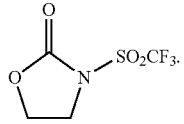

8. The lithium air battery of claim 6, wherein the negative electrode comprises at least one selected from the group consisting of lithium metal, a lithium metal-based alloy, and a lithium intercalation compound.

9. The lithium air battery of claim 8, wherein the lithium metal-based alloy is an alloy of aluminum, tin, magnesium, indium, calcium, titanium, vanadium, or a combination thereof with lithium.

10. The lithium air battery of claim 6, wherein the positive electrode is a porous carbon-based material.

11. The lithium air battery of claim 10, wherein the porous carbon-based material is carbon black, graphite, graphene, activated carbon, carbon fibers, and combinations thereof.

12. The lithium air battery of claim 6, wherein the positive electrode further copromises an oxygen reduction catalyst.

13. The lithium air battery of claim 12, wherein the oxygen reduction catalyst is a noble metal-based catalyst, an oxide-based catalyst, an organic metal-based catalyst, or combinations thereof.

14. The lithium air battery of claim 13, wherein:
the noble metal-based catalyst is platinum, gold, silver, palladium, ruthenium, rhodium, or osmium,
the oxide-based catalyst is manganese oxide, iron oxide, cobalt oxide, or nickel oxide, and
the organic metal-based catalyst is cobalt phthalocyanine.

15. The lithium air battery of claim 6, wherein a separator is disposed between the positive electrode and the non-aqueous electrolyte.

16. The lithium air battery of claim 6, wherein the non-aqueous electrolyte is selected from the group consisting of a carbonate-based solvent, an ester-based solvent, an ether-based solvent, a ketone-based solvent, an organosulfur-based solvent, an organophosphorus-based solvent, a nonprotonic solvent, and combinations thereof.

17. The lithium air battery of claim 6, wherein the non-aqueous electrolyte is selected from the group consisting of ethylene carbonate (EC), propylene carbonate (PC), butylene carbonate (BC), dimethyl carbonate (DMC), diethyl carbonate (DEC), dipropyl carbonate (DPC), dibutyl carbonate (DBC), ethyl methyl carbonate (EMC), methyl propyl carbonate (MPC), ethyl propyl carbonate (EPC), fluoroethylene carbonate (FEC), dibutyl ether, tetraglyme, diglyme, dimthoxyethane, tetrahyrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof.

18. The lithium air battery of claim 6, wherein the non-aqueous organic electrolyte further comprises a lithium salt.

19. The lithium air battery of claim 18, wherein the lithium salt is one or more salts selected from the group consisting of LiPF$_6$, LiBF$_4$, LiSbF$_6$, LiAsF$_6$, LiN(SO$_2$C$_2$F$_5$)$_2$, Li(CF$_3$SO$_2$)$_2$N, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (where x and y are natural numbers), LiF, LiBr, LiCl, LiI, and LiB(C$_2$O$_4$)$_2$ (lithium bis(oxalato) borate; LiBOB).

20. The lithium air battery of claim 18, wherein the concentration of the lithium salt ranges from about 0.1 to about 2.0 M.

* * * * *